US005505530A

United States Patent [19]
Kramer et al.

[11] Patent Number: 5,505,530
[45] Date of Patent: Apr. 9, 1996

[54] DAMPED PISTON ASSEMBLY FOR AN ANTI-LOCK BRAKING SYSTEM PUMP

[75] Inventors: David J. Kramer, Oberursel, Germany; Brian P. Romanchuk, Shelby Township, Mich.

[73] Assignee: ITT Corporation, New York, N.Y.

[21] Appl. No.: 334,701

[22] Filed: Nov. 4, 1994

[51] Int. Cl.$^6$ ........................................... B60T 8/40
[52] U.S. Cl. ..................... 303/116.4; 303/10; 303/87; 417/273
[58] Field of Search ............................. 303/116.4, 10–12, 303/116.1, 61, 87, 119.1; 92/84; 417/273, 540

[56] References Cited

U.S. PATENT DOCUMENTS 4,850,825  7/1989  Budecker .................................. 417/273
5,346,292  9/1994  Hall .

*Primary Examiner*—Douglas C. Butler
*Attorney, Agent, or Firm*—Dykema Gossett

[57] ABSTRACT

A damped piston assembly is configured for use in a vehicle anti-lock braking system pump includes a piston, an insert and an elastomeric annular element. The piston has an axial cavity in a piston end portion. The insert has a cylindrical portion slip fit to the axial cavity of the piston. The insert also has a lip at an insert end portion with a diameter larger than the axial cavity of the piston and less than or equal to an outside diameter of the piston. The an elastomeric annular element is positioned between the lip of the insert and the end portion of the piston. The elastomeric annular element defines a gap between an end of the cylindrical portion of the insert and a bottom of the axial cavity in the piston when the piston is in an unloaded condition.

6 Claims, 2 Drawing Sheets

DAMPED PISTON ASSEMBLY FOR AN ANTI-LOCK BRAKING SYSTEM PUMP

FIELD OF THE INVENTION

The present invention relates to anti-lock braking system for motor vehicles. More specifically, the present invention relates to pumps used with anti-lock braking systems.

BACKGROUND OF THE INVENTION

Typical anti-lock brake systems are able to prevent a vehicle wheel from completely locking up, or stopping rotation, while the vehicle is still in motion.

Pressure to a wheel brake is selectively interrupted to prevent lock up of the wheel. A first valve positioned in an inlet conduit between a master cylinder and the wheel brake is closed. Residual pressure within the wheel brake is released by opening a second valve positioned in an outlet conduit which is fluidly connected with the wheel brake. The first valve is then opened and the second valve closed to restore pressure to the wheel brake, with the valves closing and opening again respectively to relieve pressure within the brake if the wheel begins to lock up again. This on-and-off cycling continues until the vehicle either comes to a stop or is traveling at a speed below a preestablished threshold limit.

Fluid is displaced from the brake during the release portion of the cycle. The displaced fluid is directed through the outlet conduit to a pump. The pump pressurizes the fluid and returns it to the inlet conduit. The pump has a motor driven eccentric which displaces a pump piston to pressurize the fluid. The motion of the piston produced by the eccentric rapidly pressurizes the hydraulic brake fluid in the pump, thereby introducing high pressure build gradients. This rapid pressurization, and the subsequent return of fluid to the inlet conduit, is believed to cause undesirable noise, deemed "fluid hammering," in the anti-lock brake system. Several methods attempt to reduce fluid hammering, however, these methods have several shortcoming and drawbacks.

One attempt at reducing fluid hammering consists of inserting a damping chamber or accumulator in the anti-lock braking system on an output or pressure side of the pump. The damping chamber is designed to reduce the high pressure build gradients, and thus reduce the fluid hammering. Although the use of damping chambers does aid in reducing fluid hammering, damping chambers fall short of eliminating the undesirable fluid hammering from the system.

Another attempt at reducing fluid hammering focuses on the internal workings of the pump itself. This approach consists of boring out an axial cavity in an end of the pump piston. The resulting cavity is filled with a rubber plug, a Teflon™ spacer and a steel insert. Rotation of the eccentric by the motor imparts motion to the steel insert, which transfers motion to the Teflon™ spacer which transfers the motion to the rubber plug which finally transfers the motion to the pump piston. The combination of the rubber plug, the Teflon™, and the steel insert dampens the transfer of motion from the eccentric to the piston, thereby reducing the undesirable fluid hammering. This set of elements for reducing fluid hammering exhibits several limitations. First, the bearing area of the steel insert against the eccentric is only as large as the diameter of the axial cavity. The use of such a relatively small area as a bearing surface introduces a potential durability concern. Second, because of their small size, the manipulation and insertion into the piston of the rubber plug, Teflon™ spacer and steel insert is difficult.

Lastly, the reduction in fluid hammering provided by the rubber plug is limited in part because it is trapped in a space substantially equal in shape and volume to itself. The plug is thus unable to appreciably deform in response to compressive forces to provide the desired damping effect.

SUMMARY OF THE INVENTION

The present invention reduces fluid hammering in anti-lock braking systems. The invention provides an improved mechanism for damping the mechanical motion of a piston in the pump.

The present invention focuses on moderating the displacement of an internal pump piston, which in turn reduces the fluid hammering. The piston is displaced by an eccentric rotated by a motor. In the present invention, the eccentric imparts motion to the piston via an insert which is slip fit to an axial cavity in the end of the piston. The insert is constructed with a lip, which has a diameter larger than the slip fit portion of the steel insert. An elastomeric annular element is positioned between the lip of the insert and an end portion of the piston, defining a gap between an end portion of the steel insert and a bottom of the axial cavity.

When the end of the insert moves toward the bottom of the axial cavity, the lip reacting against the O-ring which reacts against the piston. The annular element deforms, acting as a spring and damper combination between the lip of the steel insert and the end of the piston. The resultant displacement of the piston is slightly less than that of the insert when pressurizing the fluid, thereby moderating the increase in pressure as a function of eccentric rotation and, reducing the fluid hammering. Furthermore, the assembly of the present invention is greatly facilitated by the use of the relatively larger and more easily manipulated annular element and insert, thereby reducing the cost of assembling the pump.

DETAILED DESCRIPTION OF THE PREFERRED EMBODIMENT

Figure 1:
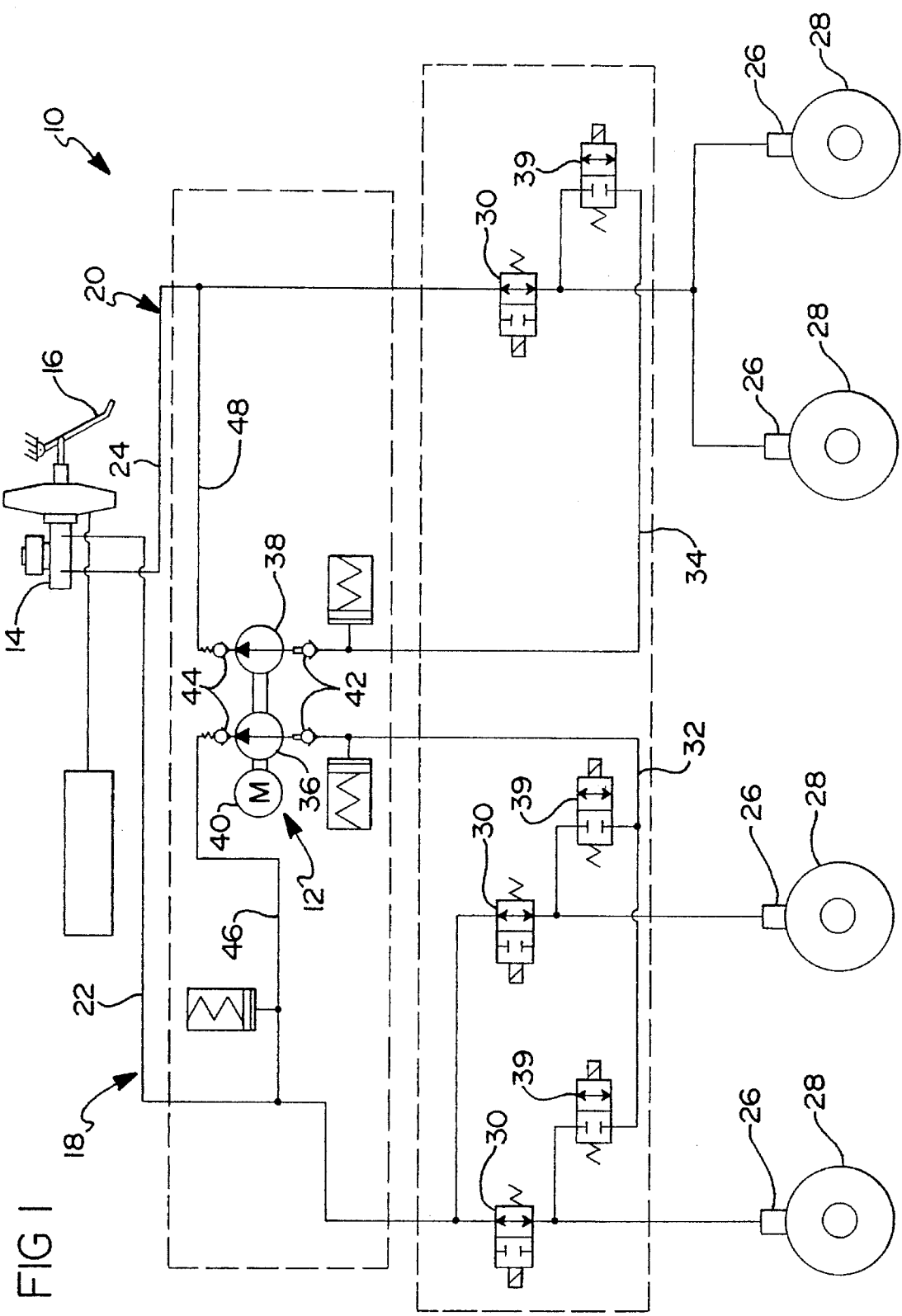
FIG. 1 is a schematic diagram of an anti-lock braking system.

FIG. 1 shows an anti-lock braking system (ABS) 10 having a motor pump assembly 12. The braking system 10 has a tandem master cylinder 14. A brake pedal 16 is disposed inside the vehicle for actuation by an operator. The pedal operably displaces a pressure piston of the master cylinder 14. A first hydraulic circuit 18 and a second hydraulic circuit 20 are connected to the master cylinder 14 by their respective inlet conduits or lines 22 and 24. The inlet conduits 22 and 24 each fluidly connect with a wheel brake 26 associated with a wheel 28. Normally open inlet valves 30 are disposed in the inlet conduits 22 and 24 between the master cylinder 14 and the wheel brakes 26. Outlet conduits 32 and 34 of the first and second hydraulic circuits 18 and 20 respectively are fluidly connected with the wheel brakes 26. This fluid connection may be achieved by intersecting the inlet conduit 22 or 24 between the inlet valve 30 and the wheel brake 26. The outlet conduits 32 and 34 connect to a first pump 36 and a second pump 38 respectively. Normally closed outlet valves 39 are disposed in the outlet conduits 32 and 34. An outlet valve 39 is associated with each inlet valve 30.

A common pump motor 40 drives both the first and second pumps 36 and 38. Associated with the pumps 36 and 38 are an inlet valve 42 on a side of the pump receiving fluid, and a pressure valve 44 on a side of the pump exhausting fluid. Return lines 46 and 48 of the first and second circuits respectively communicate fluid from leaving the pump past the pressure valve to their respective inlet conduits 22 and 24.

Figure 2:
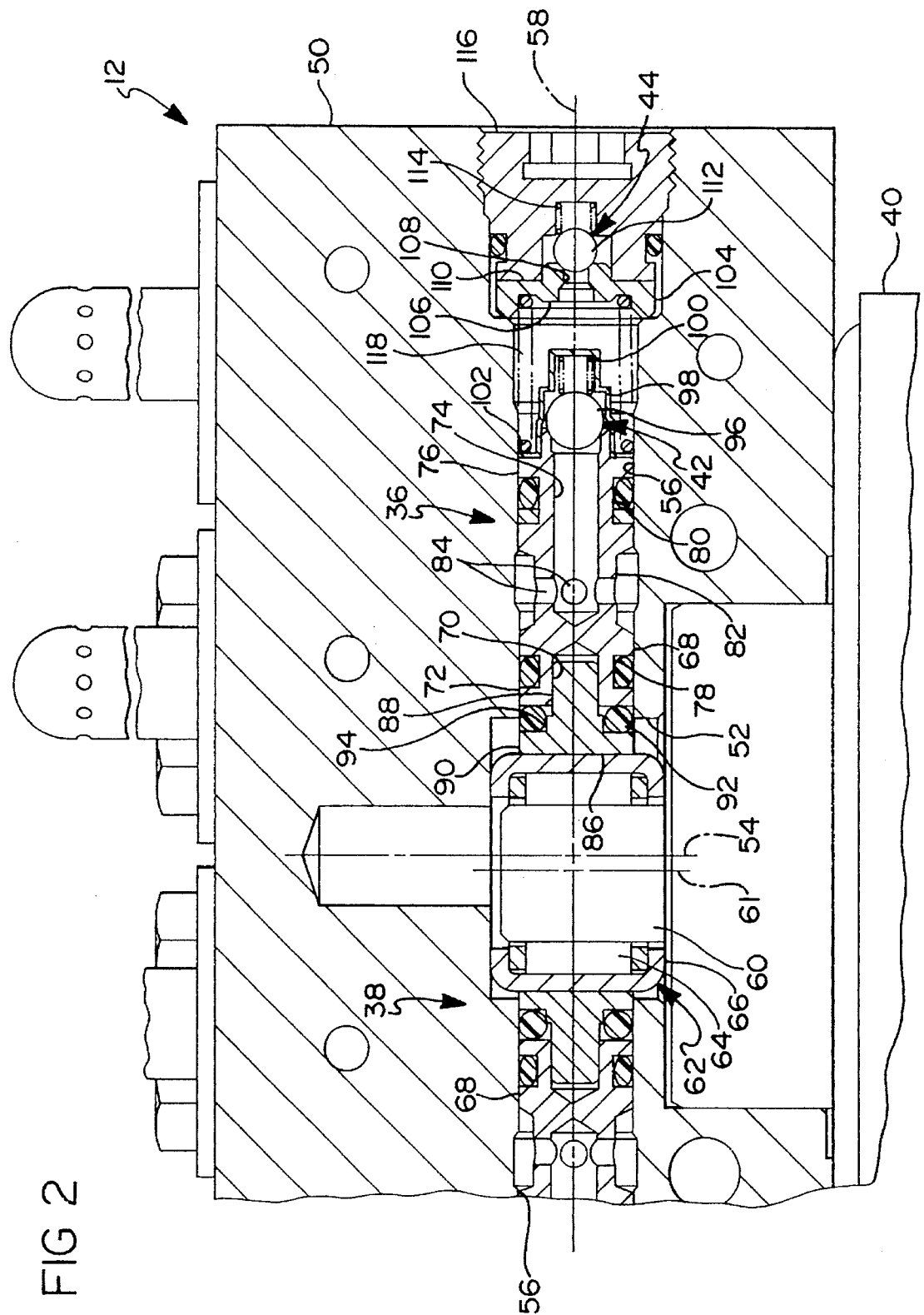
FIG. 2 is a schematic sectional diagram of an anti-lock brake system pump.

More detail of the pumps 36 and 38, the inlet valve 42 and the pressure valve 44 of the motor pump assembly 12 are shown in FIG. 2.

The motor pump assembly 12 as illustrated in Figure 2 is now described in more detail. A pump body 50 has an eccentric clearance cavity 52 centered on a motor axis 54. Two aligned piston bores, or cylinders 56, defining a cylinder diameter are located in the pump body 50, opposed across the eccentric clearance cavity 52. The cylinders 56 also define a piston axis 58 normal to the motor axis 54. 0he of the cylinders 56 defines in part the first pump 36 and is fluidly connected to the first circuit 18, for receiving fluid therefrom and returning fluid thereto. A second of the bores in part defines the second pump 38 and is fluidly connected to the second circuit 20 for receiving fluid therefrom and returning fluid thereto.

An eccentric 60, centered on an eccentric axis 61 offset from the motor axis 54, is fixed to the pump motor 40 rotation within the eccentric clearance cavity 52. The eccentric 60 has a needle roller bearing 62 disposed over it. Needle rollers 64 are disposed around the eccentric 60. A race 66 of the bearing 62 surrounds the rollers 64.

Two identical pistons 68 are slidably disposed in the cylinders 56. A piston 68 has a first axial bore 70 in a first end portion 72 disposed toward the eccentric 60, and a second axial bore 74 in a second end portion 76. The piston 68 has three grooves circumscribing it. A first groove 78 circumscribes a first end portion 72 to accommodate a first annular seal. A second groove 80 circumscribes the second end portion 76 to accommodate a second annular seal. A third groove 82 circumscribes a portion of the piston between the first and second grooves 78 and 80. The third groove 82 is aligned with an end portion of the second axial bore 74. A pair of cross bores 84 normal to the piston axis 58 connect the third groove 82 with the end of the second axial bore 74.

An insert 86, formed of stainless steel, is located at the first end portion 72 of the piston 68 for contact with the bearing race 66. The insert 86 has a cylindrical slip fit portion 88 slidably disposed in the .first end axial bore 70. A lip 90 at an end portion of the insert 86 has a diameter approximately equalling an outer diameter of the piston 68. The diameter of the lip 90 can be smaller than the outside diameter of the piston 68, but preferably not much smaller so as to provide a bearing area of maximum size for engaging the race 66. An elastomeric annular element 92, preferably an O-ring, is disposed between the lip 90 of the insert 86 and the first end portion 72 of the piston 68. The insert 86 is provided with a shoulder 94 beneath the lip 90, the shoulder having a diameter approximately equal to an inside diameter of the O-ring 92. The shoulder 94 maintains the O-ring 92 in a position concentric with the insert 86. The shoulder 94 is necessary in some applications because making the slip fit portion and the first axial bore 70 approximately equal to the inside diameter of the O-ring 92 may render the piston 68 too thin at the first groove 78. In an undeformed state, as when the piston is in an unloaded condition, the O-ring 92 defines a gap between both the shoulder 94 and the piston 68, and between an end of the slip fit portion 88 and a bottom of the first axial bore 70. Both gaps are necessary to enable relative axial motion between the insert 86 and the piston 68 which produces a desired potential for deformation of the O-ring 92. The combination of the piston 68, the O-ring 92 and the insert 96 can be singularly identified as a piston assembly.

An inlet valve check ball 96 is disposed at the second end portion 76 of the piston 68, operably blocking the second axial bore 74. A cup shaped spring support 98, open at both ends, is disposed over the second end portion 76 of the piston 68 and retains the check ball 96. An inlet valve spring 100 disposed between the spring support 98 and the ball 96 biases the ball 96 toward the second end portion 76 of the piston 68.

A piston return spring 100 is disposed over the spring support 98. A first end of the piston return spring 102 engages a lip of the spring support 98, indirectly pressing against the piston 68. A second end of the return spring 102 is engaged by a spring retainer 104 having a spring seat on a first side 106. A bore 108 passes through the spring retainer 104 from the first side 106 to a second side 110. A pressure valve check ball 112 of the pressure valve 44 is disposed over the bore 108 in the retainer 104 and is biased thereagainst by a pressure valve spring 114. An end plug 116 is threaded into the pump body 50 to close an outside end of the cylinder 56. The end plug 116 traps the pressure valve spring 114 and holds the spring retainer 104 in place within the cylinder 56.

A space or volume 118 between the inlet check valve and the pressure check valve is characterized as a pressure chamber 118. The pressure chamber 118 varies in volume with a position of the piston 68 in the cylinder 56. The pressure valve check ball 112 is exposed to pressure from the pressure chamber 118 on one side and to pressure from the return line 46 through a passage (not shown) on an opposed side.

The invention operates in the following manner. An electronic control unit (ECU) (not shown) monitors the rotational velocity of each of the wheels 28. When the ECU detects a wheel 28 in a lock up condition, it simultaneously causes the associated inlet valve 30 to close and the associated outlet valve 39 to open momentarily. If the lock up condition recurs when the inlet and outlet valves are opened and closed respectively, they are again momentarily closed and opened respectively.

When the inlet valve is closed and the outlet valve is open, residual pressure within the wheel brake 26 is relieved by the brake expelling a small quantity of fluid therefrom into the outlet conduit 32. The fluid expelled by the brake 26 displaces fluid in the outlet conduit 32 into the pump cylinder 56 through an opening (not shown) aligned with the third groove 82 of the piston 68. The fluid passes through the cross bores 84 and into the second axial bore 74.

Rotation of the eccentric 60 by the motor 40 causes the piston 68 to move between first and a second position. The first position (not shown) corresponds to the piston being at a maximum distance from the motor axis 54. The second position, as shown in FIG. 2, corresponds to the piston 68 being at a minimum distance from the motor axis 54. The eccentric 60 acts against the insert 86 through the needle roller bearing 62. Displacement of the insert 86 tends to produce displacements of the piston 68, with the O-ring 92 transmitting force therebetween.

The piston 68 moves from the second position to the first position in a pressurization stroke of the piston 68. The inlet valve spring 100 seats the inlet check ball 96 against the second end portion 76. The force required to displace the piston 68 with the inlet check ball 96 seated is equal to the sum of the forces acting on the piston 68 which resist displacement. The principal resistive forces are the spring load of the piston return spring 102 and the hydraulic pressure in the pressure 110 chamber induced by the motion of the piston 68 in the pressurization stroke. Pressure in the pressure chamber 118 is relieved by the pressure valve 44 past which fluid is discharged to the return line 46. The deflecting O-ring 92 reduces the potential for high build gradients to develop. The O-ring deflection flattens or smoothes out the displacement of the piston 68 as a function of time when the piston 68 nears the first position. Because the O-ring 92 is of a substantially different shape than the void in which it is located, it is able to appreciably deflect when the eccentric 60 acts against the insert 86. This deflection reduces the pressure gradients associated with the pumping action, consequently reducing fluid hammering to a significant degree.

Pressurized fluid from the pressure chamber 118 passes around the pressure valve check ball 112 and to the return line 46 when the fluid pressure within the pressure chamber 118 exerts a force against the pressure valve check ball 112 greater than the resisting force exerted by the pressure valve spring 114 and the force from the pressurized fluid within the fluid return line 46. Pressurized hydraulic brake fluid entering the return line 46 displaces fluid into the inlet conduit 22.

When the piston 68 moves from the first position back to the second position in a refill stroke, the pressure valve spring 114 and pressure in the return line 46 force the ball 112 against the second side 110 of the spring retainer 104. The inlet valve check ball 96 lifts from the second end portion 76 of the piston 68 to allow fluid to enter into the pressure chamber 118 to compensate for the volume of the piston 68 as it moves away from the spring retainer. Fluid from the outlet conduit 32 enters the piston cylinder 56, flows through the cross bores 84 and through the second axial bore 74 and past the inlet valve check ball 96 to reach the pressure chamber. Continued rotation of the eccentric initiates another pressurization stroke.

The preceding Detailed Description of the Preferred Embodiment is a description of an exemplary embodiment and is not intended to limit the scope of the invention. The appended claims must be studied to appreciate the full scope of the invention.

We claim:

1. An anti-lock braking system pump, comprising:

a pump body defining a piston cylinder having an inside diameter and a longitudinal axis;

a piston slip fit to the piston cylinder with an axial cavity in an end portion;

an insert having a cylindrical portion slidably disposed in the axial cavity of the piston and having a lip at an insert end portion with a diameter larger than the axial cavity of the piston and less than the inside diameter of the piston cylinder;

an elastomeric annular element positioned between the lip of the insert and a surface of the piston defining a gap between an end of the cylindrical portion of the insert and a bottom of the axial cavity in the piston;

a motor driven eccentric operably displacing the lip of the insert on a side opposite the O-ring and operably displacing the insert and the piston; and a piston return spring positioned between the pump body and the piston, biasing the piston toward the eccentric.

2. The anti-lock braking system pump described in claim 1, wherein the elastomeric annular element is an O-ring.

3. The anti-lock braking system pump described in claim 2, wherein a shoulder having a diameter approximately equal to an inside diameter of the O-ring is located on the insert between the lip and the slip fit portion.

4. An anti-lock braking system comprising:

a master cylinder operably pressurizing hydraulic brake fluid responsive to depression of a brake pedal by a vehicle operator;

an inlet fluid conduit connected to the master cylinder and communicating fluid pressure therefrom;

a wheel brake connected to the inlet fluid conduit and operably responsive to fluid pressure communicated from the master cylinder;

an inlet valve disposed along the inlet fluid conduit and selectively blocking communication of fluid pressure to the wheel brake;

a pump body defining a piston cylinder having an inside diameter and a longitudinal axis;

an outlet fluid conduit disposed between the brake and the pump body and communicating fluid from the brake to the piston cylinder;

an outlet valve disposed along the outlet fluid conduit and selectively opening to communicate fluid from the wheel brake to the pump body simultaneous with the inlet valve blocking communication of fluid pressure to the wheel brake;

a piston slip fit to the piston cylinder with an axial cavity in an end portion;

an insert having a cylindrical portion slidably disposed in the axial cavity of the piston and having a lip at an insert end portion with a diameter larger than the axial cavity of the piston and less than the inside diameter of the piston cylinder;

an elastomeric annular element positioned between the lip of the insert and a surface of the piston defining a gap between an end of the cylindrical portion of the insert and a bottom of the axial cavity in the piston;

a motor driven eccentric operably displacing the lip of the insert on a side opposite the O-ring and operably displacing the insert and the piston; and a piston return spring positioned between the pump body and the piston and the piston, biasing the piston toward the eccentric.

5. The anti-lock braking system described in claim 4, wherein the elastomeric annular element is an O-ring.

6. The anti-lock braking system described in claim 5, wherein a shoulder having a diameter approximately equal to an inside diameter of the O-ring is located on the insert between the lip and the slip fit portion.

* * * * *